Inventor:
Charles A. Thomas,
by His Attorney.

Patented Aug. 14, 1951

2,564,514

UNITED STATES PATENT OFFICE 2,564,514

SPEED CONTROLLING ARRANGEMENT FOR DYNAMOELECTRIC MACHINES

Charles A. Thomas, Fort Wayne, Ind., assignor to General Electric Company, a corporation of New York Application February 10, 1949, Serial No. 75,726

1 Claim. (Cl. 322—50)

My invention relates to commutating type dynamoelectric machines and more particularly to an improved speed control means by which the range of speed of a variable-speed motor may be increased, while maintaining practically a constant power output, or by which the range of current in a generator of variable voltage may be increased, while maintaining stable operating characteristics.

It is understood by those skilled in the art that the speed of a commutator type motor varies inversely with the effective magnetic flux affecting the armature. It is further understood that the stability of a motor, that is, its ability to produce a constant power output, is lessened by the effect of armature reaction flux tending to produce a negative torque and also interfering with the commutation of the motor. This armature reaction flux which is produced by current flowing in the armature of the motor varies inversely with the flux density in the magnetic flux path of the motor.

Therefore, to produce the maximum stability and best commutation in a commutator type motor, it is desirable to maintain a high flux density in the magnetic path of the motor while at the same time providing a sufficient range of air gap flux density to provide the desired range of motor speed.

As regards an electric generator, the range of current produced by the generator is directly proportional to the air gap flux density and is lessened by armature reaction produced by current flowing in the armature of the generator.

It is an object of this invention to provide an arrangement applicable to a variable speed commutator type motor for increasing the speed range of the motor for a given change in field strength while retaining stability of power output and satisfactory commutation at both high and low speeds.

It is a further object to provide an arrangement applicable to a commutator type generator of variable voltage for increasing the range of current output while retaining stability of the generator and satisfactory commutation.

In general, my invention comprises a member of magnetically conductive material positioned to bridge an air gap formed by a recess in the yoke of the motor or generator and an auxiliary coil surrounding the member and connected to an electric power source, whereby the auxiliary coil controls the flux density in the yoke.

Figure 1:
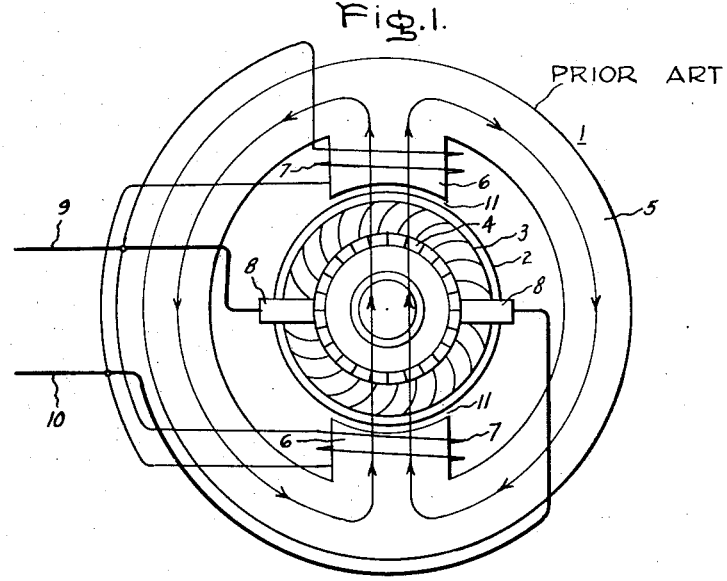
Figure 2:
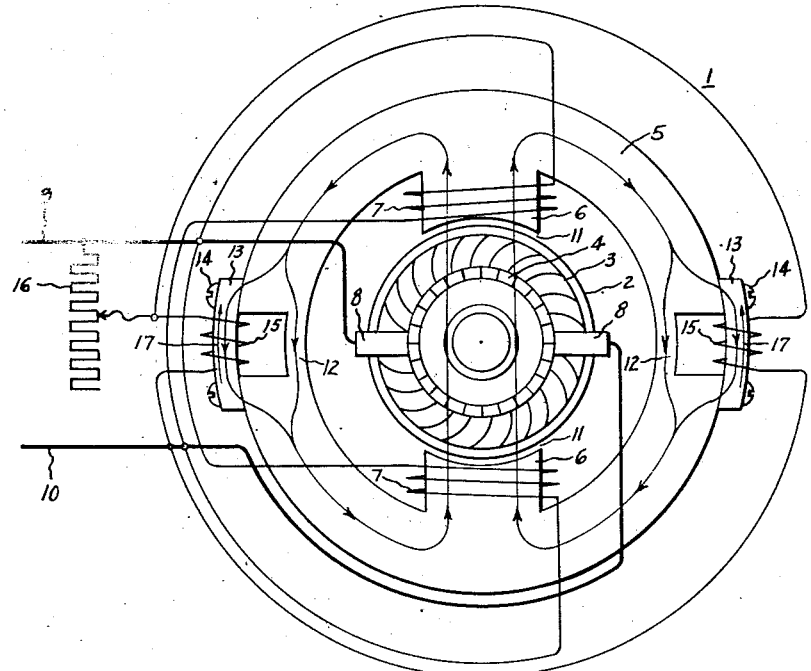

For a complete understanding of my invention, reference should be had to the following specification and the accompanying drawing wherein Fig. 1 is a schematic view of a conventional commutator-type motor showing the flux paths therein, and Fig. 2 is a schematic view of a commutator type motor constructed in accordance with my invention.

Referring to the drawing in detail, Fig. 1 shows a conventional commutator type motor 1 comprising an armature 2 having an armature winding 3 and a commutator 4, a stator yoke 5, a pair of salient pole pieces 6 secured to the yoke 5, a pair of field coils 7, and a pair of commutator brushes 8 electrically connected to power lines 9 and 10. Upon excitation of field coils 7, the current flowing therein produces magnetic flux in the two magnetic paths indicated by the arrows and crossing the air gaps 11 between the armature 2 and the adjacent faces of pole pieces 6. Although I have shown, for the purpose of illustrating my invention, a commutator type motor in which the field coils 7 are connected in parallel across the power lines 9 and 10, it will be apparent to those skilled in the art that my invention is equally applicable to a series wound motor in which the field coils are in series with the armature.

In a conventional commutator type motor as described above, the speed of armature 2 varies inversely with the flux density in the air gaps 11 and therefore may be controlled by increasing or decreasing the flux density in the air gaps 11 by regulating the amount of current which is passed through the winding of field coils 7. The flux density in air gaps 11 may also be varied by changing the width of air gap 11 or by changing the structure or composition of the elements forming the magnetic path. However, these latter means are normally not adjustable during operation of the motor.

Moreover, although the speed of the motor may be varied by controlling the current passed through field coils 7, the range of speed control thus provided is limited by the reaction flux produced by the armature current flowing in armature winding 3. This armature reaction flux distorts the flux in air gap 11 producing a negative torque on the armature and poor commutation. The detrimental effect of the armature reaction flux varies inversely with the flux density in the magnetic path. Therefore, in a conventional motor construction, as shown in Fig. 1, when an attempt is made to increase the speed of armature 2 by decreasing the flux in air gap 11, the flux density in the yoke 5 which forms a part of the magnetic path is also decreased. Thus the detrimental effect of the armature reaction flux which varies inversely with flux density in the yoke 5 increases and ultimately reaches a point where further attempts to increase the speed of armature 2 result in unsatisfactory motor operation.

To reduce the effect of armature reaction flux when the flux in air gap 11 is decreased, I provide restricted sections 12 in yoke 5, as shown in Fig. 2, and a member 13 bridging each of the restricted sections 12 forming a parallel magnetic path therewith. Member 13 is constructed of any suitable flux conductive material and is secured to yoke 5 by screws 14 or any other suitable means. Positioned on each of the members 13 is an auxiliary coil 5. Coils 15 are constructed in across lines 9 and 10 series with an adjustable resistance 16. When coils 15 are energized they produce a flux which tends to oppose the flux produced by the field coils 7 as shown by the arrows 17. Thus, when the auxiliary coils 15 are not energized the main energizing flux produced by the field coils 7 is in the direction indicated by the arrows of Fig. 2, a part of the flux in each path traversing the members 13. However, when coils 15 are energized a bucking flux is produced in the members 13 which flux limits or prevents the flow of the main energizing flux in member 13 in accordance with the voltage impressed upon coils 15, thus forcing the main flux produced by the field coils 7 into the restricted portions 12 of yoke 5. Thus, by increasing the voltage on coils 15 as the current in coils 7 is decreased, a high flux density is maintained in the restricted portions 12 of the yoke 5.

Since the armature reaction flux varies inversely with the flux density of the yoke 5 which forms a part of the magnetic path and since the bucking flux produced by auxiliary coils 15 maintains a high flux density in the yoke 5 under conditions of varying flux density in the air gap 11, the armature reaction flux no longer has the limiting effect found in the conventional motor shown in Fig. 1. The speed range of the motor is therefore increased and stability of operation of the motor is better maintained.

For the same reasons when the yoke of a generator of variable voltage is provided with the same structure shown on the motor of Fig. 2 of the drawing, the range of currents which the generator is able to produce, while maintaining stability of operation, is increased by reducing the effect of armature reaction flux in the same.

Various other arrangements for providing parallel magnetic paths in the yoke, comprising a restricted flux path and an adjustable flux path, may be used. For example, instead of providing a member bridging a recess in the yoke, an aperture may be cut in the yoke thus forming two parallel magnetic paths and an auxiliary coil used to buck the flux in one of the paths thus formed. Alternatively, a recess may be formed in the yoke and a member, slidably adjustable on the yoke, to increase or decrease an air gap between the member and the yoke, may be used, thus adjusting the flow of flux in the member and increasing or decreasing the flux density in the adjacent parallel magnetic path in the yoke without the use of an auxiliary coil.

I provide, therefore, an arrangement for commutating type dynamoelectric machines whereby the range of speed of a variable speed motor may be increased while maintaining practically a constant power output, and whereby the range of currents in a generator of variable voltage may be increased while maintaining stable operating characteristics.

In addition to an increase in the range of speed of a variable speed motor obtained by use of my invention, I find, in practice, that the ratio of change in speed to change in field strength is also increased by application of my invention, this being due to the decreased effect of the reaction flux.

While I have shown and described a particular embodiment of my invention, it will be obvious to those skilled in the art that various changes and modifications may be made without departing from my invention in its broader aspects and I, therefore, aim in the appended claim to cover all such changes and modifications as fall within the true spirit and scope of my invention.

What I claim as new and desire to secure by Letters Patent of the United States is:

A commutator type dynamoelectric machine having an armature and a stator with a yoke forming a magnetic path in said machine, a field pole on said yoke, a shunt connected main winding on said pole for producing exciting flux in said magnetic path, means for dividing a section of said magnetic path into parallel magnetic paths, one of said parallel magnetic paths being of reduced cross-section, and an auxiliary winding arranged on the other of said parallel magnetic paths and connected in parallel with said shunt winding to produce flux bucking the flux produced by said shunt winding whereby said exciting flux is confined to said reduced cross-section magnetic path, said magnetic paths and said auxiliary coil being so proportioned as to maintain when desired a high flux density in said one magnetic path under steady state conditions.

CHARLES A. THOMAS.

REFERENCES CITED

The following references are of record in the file of this patent:

UNITED STATES PATENTS

| Number | Name | Date |
|---|---|---|
| 925,499 | Parsons et al. | June 22, 1909 |
| 1,723,090 | Stevenson | Aug. 6, 1929 |